(12) United States Patent
Perlman et al.

(10) Patent No.: US 7,721,156 B2  
(45) Date of Patent: May 18, 2010

(54) SELECTIVE LOGGING OF COMPUTER ACTIVITY

(75) Inventors: Amir Perlman, Yahud (IL); Oded D. Hirschfeld, Nes-Tziona (IL)

(73) Assignee: International Business Machines Corporation, Armonk, NY (US)

(*) Notice: Subject to any disclaimer, the term of this patent is extended or adjusted under 35 U.S.C. 154(b) by 557 days.

(21) Appl. No.: 11/535,601

(22) Filed: Sep. 27, 2006

(65) Prior Publication Data

US 2008/0127111 A1 May 29, 2008

(51) Int. Cl.  
*G06F 11/00* (2006.01)

(52) U.S. Cl. ........................................ 714/45

(58) Field of Classification Search ................ 714/45  
See application file for complete search history.

(56) References Cited

U.S. PATENT DOCUMENTS

| | | | |
|---|---|---|---|
| 6,647,517 B1 | 11/2003 | Dickey et al. | |
| 6,694,456 B1 | 2/2004 | Ludwig | |
| 2002/0112203 A1* | 8/2002 | Andress et al. | 714/48 |
| 2004/0153871 A1 | 8/2004 | Pietschker et al. | |
| 2004/0205565 A1 | 10/2004 | Gupta | |
| 2005/0138471 A1 | 6/2005 | Okbay et al. | |
| 2007/0011492 A1* | 1/2007 | Swaine | 714/35 |

\* cited by examiner

*Primary Examiner*—Michael C Maskulinski  
(74) *Attorney, Agent, or Firm*—Raymond Szeto; Hoffman Warnick LLC

(57) ABSTRACT

A system and method for selective logging of computer activity. A method in accordance with an embodiment of the invention includes: temporarily logging program execution data to a memory buffer during execution of a program; and determining a permanent disposition of the temporarily logged data in accordance with an execution outcome of the program.

8 Claims, 5 Drawing Sheets

SELECTIVE LOGGING OF COMPUTER ACTIVITY

FIELD OF THE INVENTION

The present invention relates to computer processing in general, and more particularly to logging computer activity, such as for debugging purposes.

BACKGROUND OF THE INVENTION

Classic techniques for logging computer activity, such as are typically used for debugging computer software, involve creating software instructions to monitor a computer program during its execution and record information related to its execution, such as the values of program variables at different points during execution, as well as information related to program flow. Such information is stored in a file that may be reviewed to identify coding errors and other anomalies. Unfortunately, such techniques are all-or-nothing propositions, where monitoring is either activated or not for all execution scenarios. Furthermore, while different aspects of a program may be monitored for different reasons, reviewing logged information is often difficult and inefficient where a single log file is used, and where most of the logged information is not related to a particular aspect of program execution that the reviewer is investigating.

SUMMARY OF THE INVENTION

The present invention discloses a system and method for selective logging of computer activity.

In accordance with an embodiment of the present invention a method for logging program execution data is provided. The method comprises: temporarily logging program execution data to a memory buffer during execution of a program; and determining a permanent disposition of the temporarily logged data in accordance with an execution outcome of the program.

In accordance with another embodiment of the present invention a method for configuring a computer program to log information accessible to the computer program is provided. The method comprises: a) configuring each of a plurality of sets of computer program instructions to: 1) determine a severity level associated with an item of information accessible to the computer program; and 2) preserve the severity level until a final logging criterion is evaluated; b) configuring the computer program to include the plurality of sets of computer program instructions; and c) configuring the computer program to evaluate the final logging criterion and to store the preserved severity levels in a data file if the final logging criterion is met.

In accordance with yet another embodiment of the present invention a system for logging program execution data is provided. The system comprises: a logging code segment configured to temporarily log program execution data to a memory buffer during execution of a program; and a final logging decision system configured to determine a permanent disposition of the temporarily logged data in accordance with an execution outcome of the program.

In accordance with another embodiment of the present invention a system for configuring a computer program to log information accessible to the computer program is provided. The system comprises: a computer program including a plurality of sets of computer program instructions configured to: 1) determine a severity level associated with an item of information accessible to the computer program; and 2) preserve the severity level until a final logging criterion is evaluated; and a final logging decision system configured to evaluate the final logging criterion and to store the preserved severity levels in a data file if the final logging criterion is met.

In accordance with another embodiment of the present invention, a program product stored on a computer readable medium for configuring a computer program to log information accessible to the computer program is provided. The computer readable medium includes program code for: temporarily logging program execution data to a memory buffer during execution of a program, and determining a permanent disposition of the temporarily logged data in accordance with an execution outcome of the program.

In accordance with another embodiment of the present invention, a method for deploying an application for configuring a computer program to log information accessible to the computer program is provided. The method comprises: providing a computer infrastructure being operable to: temporarily log program execution data to a memory buffer during execution of a program; and determine a permanent disposition of the temporarily logged data in accordance with an execution outcome of the program.

BRIEF DESCRIPTION OF THE DRAWINGS

The present invention will be understood and appreciated more fully from the following detailed description taken in conjunction with the appended drawings.

DETAILED DESCRIPTION OF THE INVENTION

Figure 1:
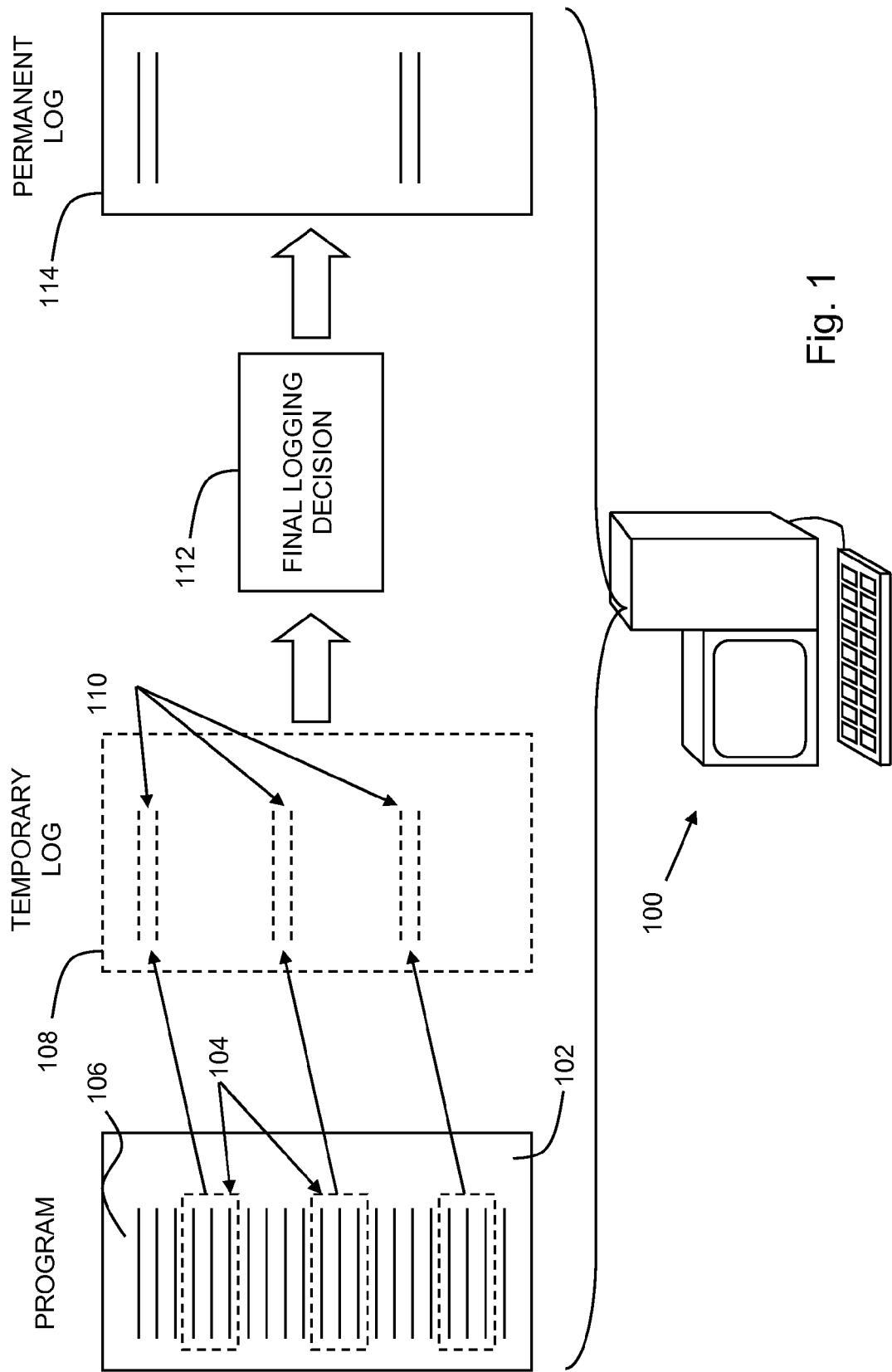
FIG. 1 depicts an illustrative system for selective logging of computer activity, constructed and operative in accordance with an embodiment of the present invention.
Figure 2:
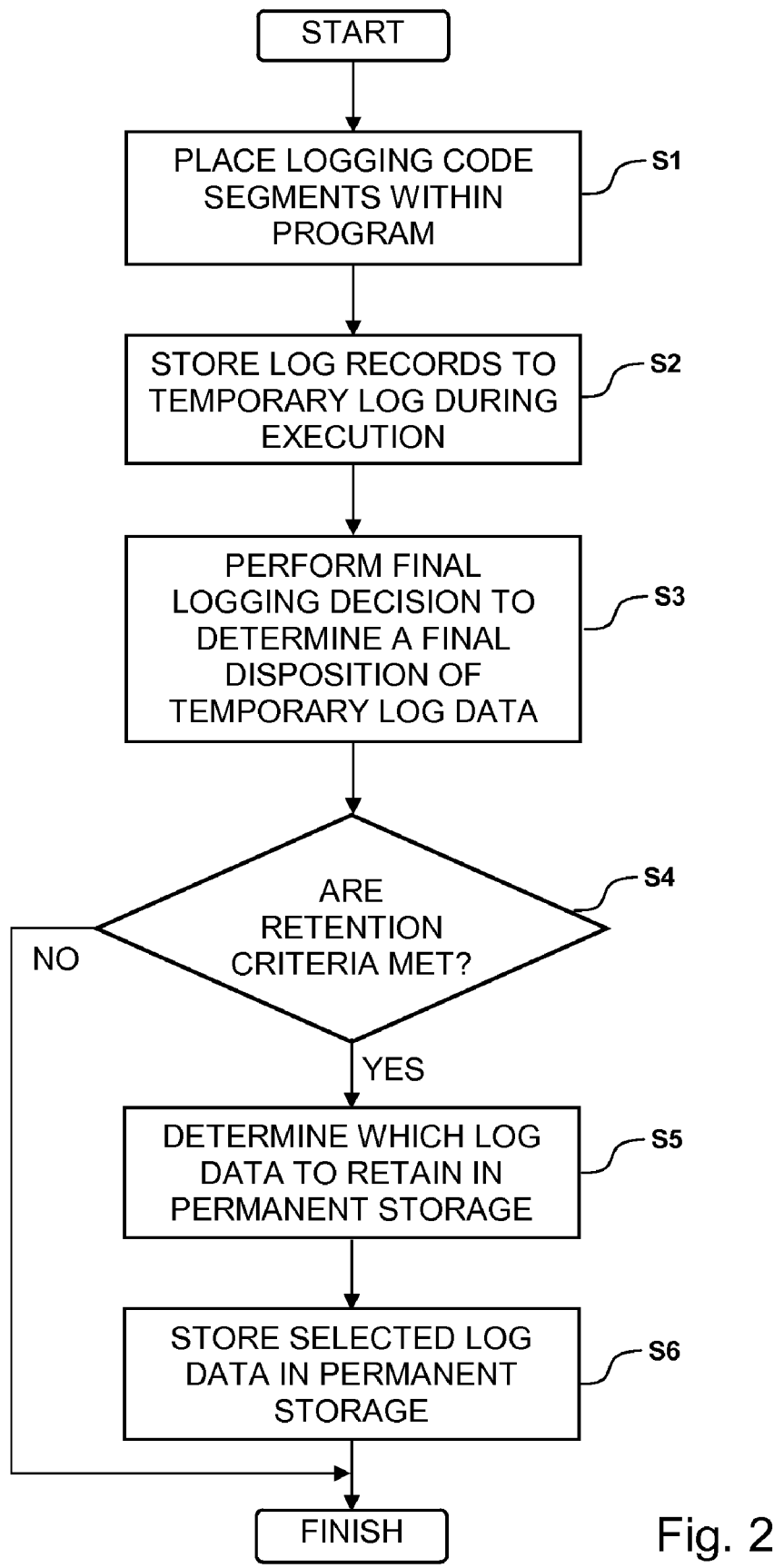
FIG. 2 depicts an illustrative flowchart of an exemplary method of operation of the system of FIG. 1, operative in accordance with an embodiment of the present invention.

Reference is now made to FIG. 1, which depicts an illustrative system for selective logging of computer activity, constructed and operative in accordance with an embodiment of the present invention, and additionally to FIG. 2, which depicts an illustrative flowchart of an exemplary method of operation of the system of FIG. 1, operative in accordance with an embodiment of the present invention. In the system and method of FIGS. 1 and 2, a computer 100 is shown on which a program 102 is executed. Program 102 includes one or more logging code segments 104 embedded (step S1) within program code 106. During execution of program 102, logging code segments 104 monitor program 102 and store one or more log records 110 of information related to its execution to a temporary log 108 (step S2), which is preferably stored in a memory buffer of computer 100. Such information may include, for example, program variables, operating system variables, program flow information, and/or any other information that is accessible to program 102 and/or logging code segments 104. At any point during the execution of the program 102, or once execution of program 102 has concluded, computer 100 performs a final logging decision 112 to determine a final disposition of the temporarily logged data (steps S3-S6). This can include, for example, retaining none, some, or all of the temporarily logged data in the temporary log 108 in a permanent log 114 (steps S4-S6), which can be a data file or any other permanent data storage medium, and retained by computer 100 for analysis. Final logging decision 112 can include, for example, any criteria for determining which log records 110 are to be retained (i.e., all, some, none), such as whether the execution of program 102 was successfully completed or failed, whether the execution of a scenario was successfully completed or failed (see FIG. 4), or whether specific execution conditions exist, such as whether certain memory usage criteria or CPU usage criteria were met or whether an error was encountered.

Figure 3:
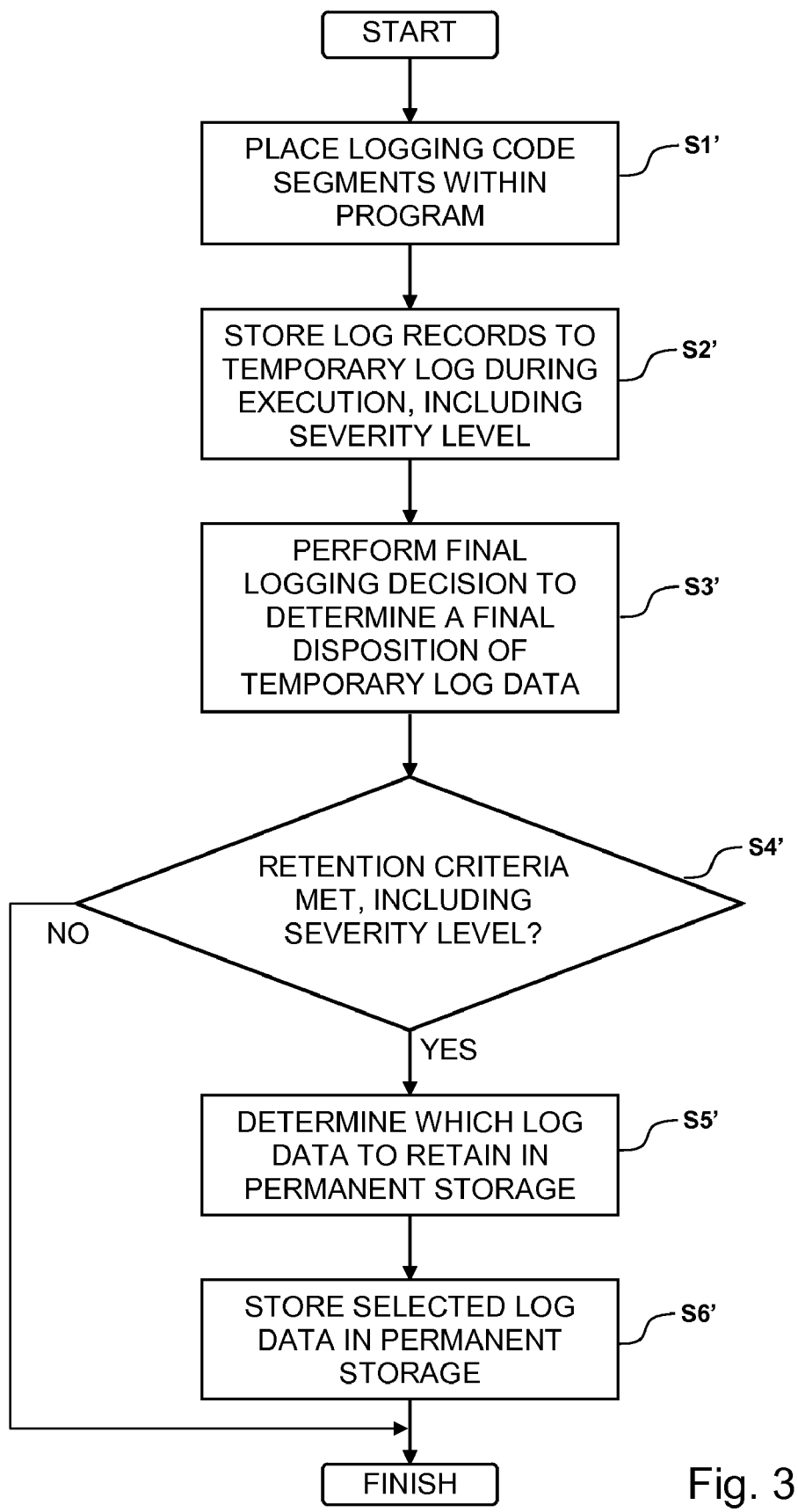
FIG. 3 depicts an illustrative flowchart of an exemplary method of operation of the system of FIG. 1, operative in accordance with another embodiment of the present invention.

Reference is now made to FIG. 3, which depicts an illustrative flowchart of an exemplary method of operation of the system of FIG. 1, operative in accordance with another embodiment of the present invention. The method of FIG. 3 is substantially similar to the method of FIG. 2 with the notable exception that logging code segments 104 (step S1') may record a severity level (step S2') along with log record 110, such as indicating "normal,", "warning," or "error." Final logging decision 112 (steps S3'-S6') may then choose to retain log records 110 based on their severity level, such as retaining only those log records 110 have a severity level of "error." Additionally or alternatively, final logging decision 112 may choose to all retain log records 110 if a particular severity level is recorded for any log record 110, such as where all log records 110 are retained if any log record 110 has a severity level of "error." Additionally or alternatively, logging code segments 104 may set and maintain a global severity level that final logging decision 112 may use to decide which log records 110 to maintain, such as where all log records 110 having a severity level of "warning" or "error" are retained if the global severity level is set to "warning" or "error."

Figure 4:
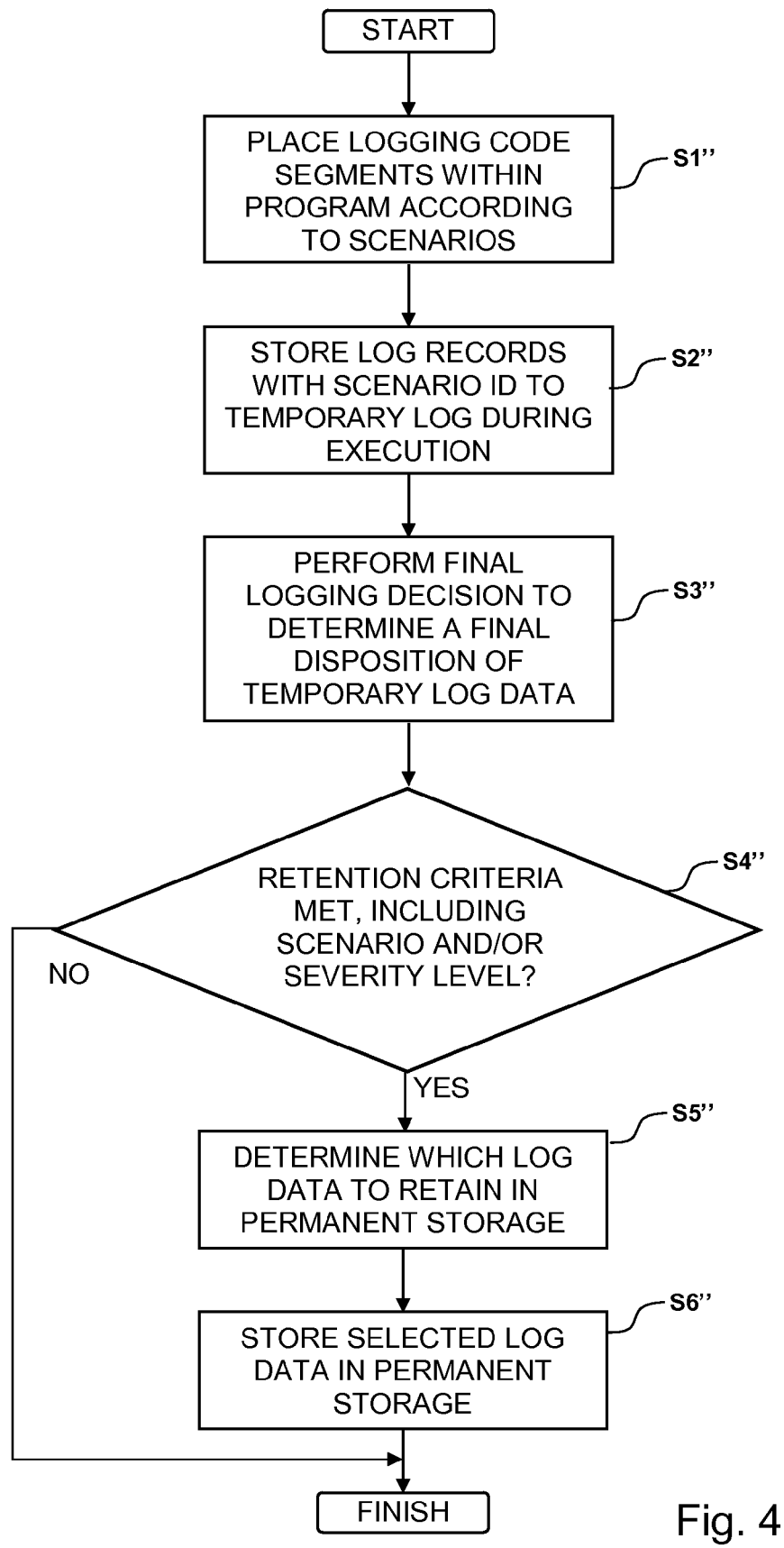
FIG. 4 depicts an illustrative flowchart of an exemplary method of operation of the system of FIG. 1, operative in accordance with another embodiment of the present invention.

Reference is now made to FIG. 4, which depicts an illustrative flowchart of an exemplary method of operation of the system of FIG. 1, operative in accordance with another embodiment of the present invention. The method of FIG. 4 is substantially similar to the methods of FIGS. 2 and 3, with the notable exception that one or more groups of logging code segments 104 are designed to correspond to one or more scenarios being monitored (step S1"). For example, a group A of logging code segments 104 may be designed to record information during the execution of program 102 that relates to the recording of a product order, while another group B of logging code segments 104 may be designed to record information that relates to the processing of a credit card. Logging code segments 104 of group A may record a group ID identifying group A along with its log records 110, while logging code segments 104 of group B may record a group ID identifying group B along with its log records 110. Final logging decision 112 (steps S3"-S6") may then choose to retain log records 110 based on which group they belong to and/or by severity level as described above, such as retaining only those log records 110 that belong to group A and that have a severity level of "error."

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

Figure 5:
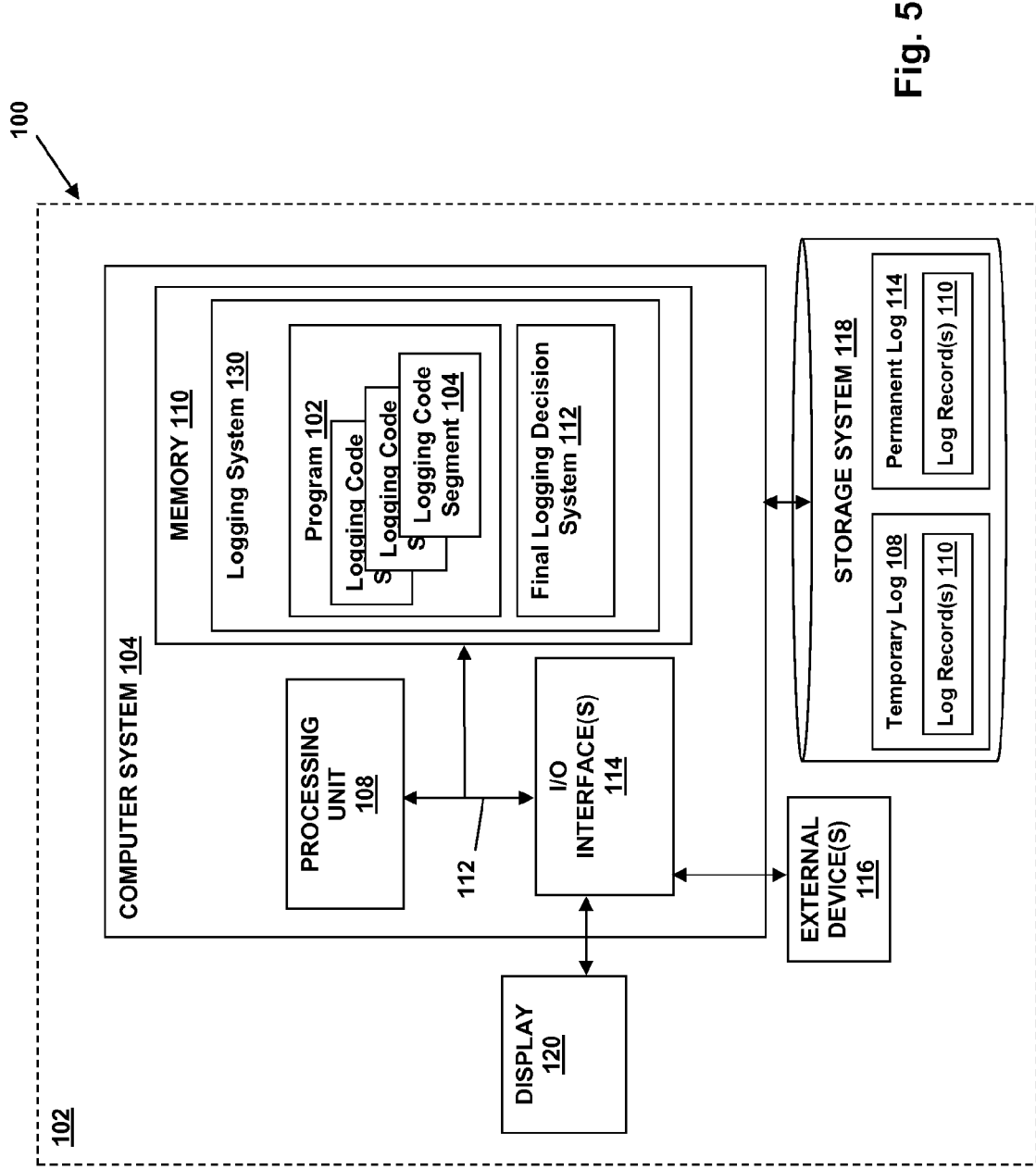
FIG. 5 depicts an illustrative computer system for implementing embodiment(s) of the present invention.

FIG. 5 depicts an illustrative system 100 in accordance with embodiment(s) of the present invention. The system 100 includes a computer infrastructure 102 that can perform the various process steps described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user (not shown) to interact with the computer system 104 or any device that enables the computer system 104 to communicate with one or more other computer systems.

In accordance with an embodiment of the present invention, the program code stored in the memory 110 comprises a logging system 130 for the selective logging of computer activity during execution of a program 102. One or more logging code segments 104 are embedded within the code of the program 102. During execution of program 102, the logging code segments 104 monitor the program 102 and store one or more log records 110 of information related to its execution to a temporary log 108 (e.g., in storage unit 118). A final logging decision system 132 determines a final disposition of the temporarily logged data, and can include, for example, retaining none, some, or all of the temporarily logged data in the temporary log 108 in a permanent log 114. The operation carried out by each of these systems is described in greater detail above.

The computer system 104 can comprise any general purpose computing article of manufacture capable of executing computer program code installed by a user (e.g., a personal computer, server, handheld device, etc.). However, it is understood that the computer system 104 and the is only representative of various possible computer systems that may perform the various process steps of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in one embodiment, the computer infrastructure 102 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 5 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in one embodiment, the invention provides a computer-readable medium that includes computer program code to enable a computer infrastructure to carry out and/or implement the various process steps of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. A service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the process steps of the invention can be obtained (e.g., created, purchased, used, modified, etc.) and deployed to the computer infrastructure. The deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for logging program execution data, comprising:
   temporarily logging program execution data to a temporary log stored in a memory buffer during execution of a program, the temporary logging comprising:
      embedding logging code segments in the program;
      monitoring the program using the logging code segments during execution of the program to generate log records; and
      storing the log records in the temporary log;
   and
   determining a permanent disposition of the log records stored in the temporary log in accordance with an execution outcome of the program, the determining comprising storing, in a permanent log, at least one of the log records stored in the temporary log if an error is detected by at least one of the logging code segments during execution of the program.

2. A method according to claim 1, further comprising:
   storing the permanent log on a permanent data storage medium.

3. A method according to claim 1, wherein the determining further comprises:
   identifying a desired portion of the log records stored in the permanent log; and
   storing the identified portion of the log records stored in the permanent log on a permanent data storage medium.

4. The method of claim 1, wherein the logging code segments determine and store a severity level together with each log record in the temporary log.

5. A system for logging program execution data, comprising:
   at least one computer device, including:
      a plurality of logging code segments configured to temporarily log program execution data to a temporary log stored in a memory buffer during execution of a program, wherein the logging code segments are embedded in the program, wherein the logging code segments monitor the program during execution of the program to generate log records, and wherein the logging code segments store the log records in the temporary log; and
      a final logging decision system configured to determine a permanent disposition of the log records stored in the temporary log in accordance with an execution outcome of the program, wherein the final logging decision system stores, in a permanent log, at least one of the log records stored in the temporary log if an error is detected by at least one of the logging code segments during execution of the program.

6. A system according to claim 5, wherein the final logging decision system stores the permanent log on a permanent data storage medium.

7. A system according to claim 5, wherein the final logging decision system:
   identifies a desired portion of the log records stored in the permanent log; and
   stores the identified portion of the log records stored in the permanent log on a permanent data storage medium.

8. The system of claim 5, wherein the logging code segments determine and store a severity level together with each log record in the temporary log.

* * * * *